United States Patent [19]
Nakayama

[11] Patent Number: 5,185,714
[45] Date of Patent: Feb. 9, 1993

[54] ARITHMETIC OPERATION PROCESSING APPARATUS

[75] Inventor: Tadayoshi Nakayama, Tokyo, Japan

[73] Assignee: Canon Kabushiki Kaisha, Tokyo, Japan

[21] Appl. No.: 899,137

[22] Filed: Jun. 16, 1992

Related U.S. Application Data

[63] Continuation of Ser. No. 583,134, Sep. 17, 1990, abandoned.

[30] Foreign Application Priority Data

Sep. 19, 1989 [JP] Japan .................................. 1-243772
Nov. 28, 1989 [JP] Japan .................................. 1-310000

[51] Int. Cl.$^5$ .......................... G06F 7/00; G06F 7/52
[52] U.S. Cl. ................... 364/750.5; 364/736; 364/754
[58] Field of Search ............ 364/750.5, 754–757, 364/759–760, 736

[56] References Cited

U.S. PATENT DOCUMENTS

| | | | |
|---|---|---|---|
| 3,814,924 | 6/1974 | Tate | 364/757 |
| 4,573,136 | 2/1986 | Rossiter | 364/750.5 |
| 4,594,680 | 6/1986 | Schomburg et al. | 364/757 X |
| 4,679,164 | 7/1987 | Rearick | 364/754 X |

*Primary Examiner*—Tan V. Mai
*Attorney, Agent, or Firm*—Fitzpatrick, Cella, Harper & Scinto

[57] ABSTRACT

An arithmetic operation processing apparatus in which one or more multipliers and a plurality of multiplicands are inputted, a multiplication result between one multiplier and one multiplicand and a multiplication result between a complement of the one multiplicand and the other multiplier are added together and outputted. The arithmetic operation processing apparatus includes a plurality of selectors each for selectively outputting the one multiplicand or the other multiplicand in accordance with a plurality of control signals generated from the one multiplier; and an adder for adding together outputs from the selectors.

15 Claims, 10 Drawing Sheets

NUMERAL IN PARENTHESES
DESIGNATES WEIGHT

ARITHMETIC OPERATION PROCESSING APPARATUS

This application is a continuation of application Ser. No. 07/583,134 filed Sept. 17, 1990, now abandoned.

BACKGROUND OF THE INVENTION

Field of the Invention

The present invention relates to an arithmetic operation processing apparatus sequentially executing predetermined multiplication and addition operations and aiming at simplifying circuit structure greatly and reducing the operation time of an arithmetic operation processing apparatus.

RELATED BACKGROUND ART

In calculating four digital data A, B, J and K to obtain a new data M with the following equation (1).

$$M = J \times A + K \times B \qquad (1)$$

it is necessary to execute a multiplication operation twice and an addition operation once.

In calculating in real time digital data A, B, J and K changing with time, if a time divisional multiplication operation by a single multiplier is not allowed because of operation time, it is necessary to use two multipliers for the parallel multiplication of (J×A) and (K×B) and one adder. Such a digital arithmetic operation processing apparatus is known as shown in FIG. 1.

In this digital arithmetic operation processing apparatus, as shown in FIG. 1, three-bit digital data J and A are multiplied together, three-bit digital data K and B are multiplied together, and both the results are added together to obtain a new digital data M (=m6, m5, m4, m3, m2, m1, m0). Thus, there are provided a first multiplier 101 for the multiplication of J×A, a second multiplier 102 for the multiplication of K×B, and an adder 103 for the addition of the multiplied results by the multipliers 101 and 102. Each multiplier 101, 102 is constructed of nine logical multiplication circuits (hereinafter called AND gate) 104 to 112, 113 to 122, and an adder 121, 122 for the weighted addition of outputs from the AND gates. Each AND gate executes a logical multiplication of J×A, K×B.

The digital data A is supplied via a latch circuit 123 to the first multiplier 101, and the digital data J via a latch circuit 124. The digital data J is supplied via a latch circuit 125 to the second multiplier 102, and the digital data B via a latch circuit 126.

The operation of the digital arithmetic operation processing apparatus constructed as above will be described next.

In the operation of the first multiplier 101, the AND gates 104 to 112 execute a logical multiplication operation of the three-bit data A (a2, a1, a0) and J (j2, j1, j0).

Specifically, one input terminals of the AND gates 104 to 106 constituting a first group 101a are inputted with the bit data J2 of the highest digit ($2^2$) of the multiplier J, and the other input terminals thereof are inputted with the bit data (a2, a1, a0) of the multiplicand A, to thereby execute a logical multiplication operation of the supplied data.

The AND gates 104 to 106 of the first group 101a therefore output logical multiplications j2a2, j2a1, and j2a0.

Similarly, the AND gates 107 to 109 constituting a second group 101b execute a logical multiplication operation between the bit data (j1) of the second digit ($2^1$) of the multiplier J and the multiplicand A. The AND gates 110 to 112 constituting a third group 101c execute a logical multiplication operation between the bit data ($j^0$) of the lowest digit ($2^0$) of the multiplier J and the multiplicand A.

The AND gates 107 to 112 of the first and second groups 101b and 101c therefore output logical multiplications j1a2, j1a1, j1a0, j0a2, j0a1, and j0a0.

The logical multiplications by the AND gates 104 to 112 correspond to the operation indicated at X in the following multiplication between three-digit numbers.

$$
x \begin{cases}
\begin{array}{r}
a2\,a1\,a0 \\
\times\ j2\,j1\,j0 \\
\hline
j0a2\,j0a1\,j0a0 \\
\end{array} \ldots \text{logical multiplication by 1st group (101a)} \\
j1a2\,j1a1\,j1a1 \ldots \text{logical multiplication by 2nd group (101b)} \\
+ j2a2\,j2a1\,j2a0 \ldots \text{logical multiplication by 3rd group (101c)}
\end{cases}
$$

$$
\left.
\begin{array}{c}
j2a2 \quad \downarrow \quad \downarrow \quad \downarrow \quad j0a0 \\
j1a2 + j2a1 \quad j0a1 + j1a0 \\
j0a2 + j1a1 + j2a0
\end{array}
\right\} \text{addition by adder (121)}
$$

Next, the logical multiplications obtained above are added together by the adder 121 to obtain addition outputs (multiplication results) S5, S4, S3, S2, S1 and S0. This addition operation corresponds to the portion indicated by Y in the above equation (2).

The adder 121 is constructed of, for example as shown in FIG. 2, three half adders 128 to 130 and three full adders 131 to 133.

The second multiplier 102 operates similar to the first multiplier 101 in the manner described above. Namely, the AND gates 113 to 121 of first to third groups 102a to 102c execute a logical multiplication operation between the multiplicand B (b2, b1, b0) and multiplier K (k2, k1, k0), and the adder 122 executes an addition operation to obtain addition outputs (multiplication results) t5, t4, t3, t2, t1 and t0.

The addition outputs S5 to S0 and t5 to t0 calculated as above are supplied to the adder 103 to obtain M (m6, m5, m4, m3, m2, m1, m0) for the equation (1).

In calculating a new data M by mixing two digital data A and B by a ratio of (1−k) : K (0≦K≦1) and adding together, the data J in the above equation (1) is replaced by (1−K) resulting in the following equation.

$$M = (1-K) \times A + K \times B \qquad (3)$$

In order to realize a digital operation apparatus performing such operations, there is provided as shown in FIG. 3 a converter 127 for converting a multiplier K into another multiplier (1−K). This multiplier (1−K) instead of J is supplied to the latch circuit 124.

In FIG. 3, like circuit elements to those shown in FIG. 1 are represented by using identical reference numbers, and the description therefor is omitted.

As described above, in executing the arithmetic operation of the equation (1) or (3) at high speed by using the conventional technique, it becomes necessary to use two multipliers 101 and 102 and one adder 103.

Such a digital arithmetic operation processing apparatus accordingly becomes large in its circuit scale and has a high cost. In addition, the number of circuit elements is considerably large, posing a problem of a low reliability.

Furthermore, at each multiplier side 101, 102, both a logical multiplication and addition operations are required, posing the problem of a longer arithmetic operation processing time, i.e., a longer delay time between data input and output.

SUMMARY OF THE INVENTION

The present invention has been made in consideration of the above circumstances. It is an object of the present invention to provide an arithmetic operation processing apparatus of a small circuit scale, reduced number of circuit elements, low cost and short processing time.

In order to achieve the above objects, an embodiment of this invention provides an arithmetic operation processing apparatus in which a plurality pair of multipliers and multiplicands are inputted, multiplication results of respective pairs are added together and outputted. The apparatus comprises: a selector for selectively outputting one of addition results between a multiplier group and between multiplicands, by using as a control signal the bit data of the multipliers; and an adder for adding together the outputs from the selector.

In order to achieve the above object, another embodiment of this invention provides an arithmetic operation processing apparatus wherein one or more multipliers and a plurality of multiplicands are inputted, a multiplication result between one multiplier and one multiplicand and a multiplication, result between a complement of said one multiplicand and another multiplier are added together and outputted. The apparatus comprises: a plurality of selectors each for selectively outputting the one multiplicand or the other multiplicand in accordance with a plurality of control signals generated from the one multiplier; and an adder for adding together outputs from the selectors.

According to the above-described embodiments, by using selectors which can be switched in a suitable way in accordance with a control signal generated from a multiplier, conventional duplicated circuit portions are not needed, resulting in a small circuit scale and a considerably reduced number of circuit elements.

Furthermore, the number of addition operations for multiplicands A and B can be reduced, resulting in a considerably improved operation time required for the equations (1) and (3).

The above and other objects and advantages of the present invention will become apparent from the following description when read in connection with the accompanying drawings.

DESCRIPTION OF THE PREFERRED EMBODIMENTS

Figure 1:
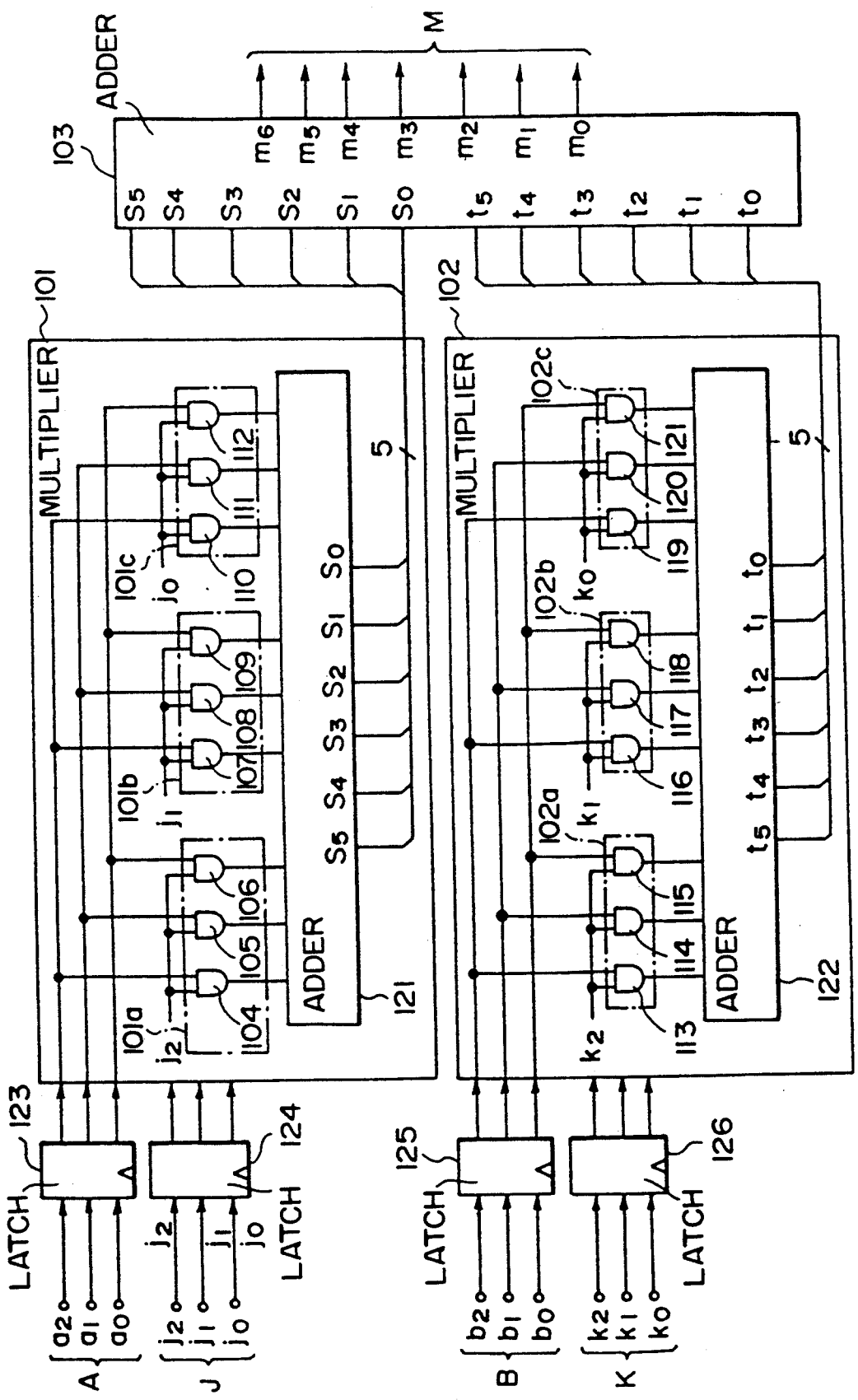
FIG. 1 is a block diagram showing an example of a conventional operation processing circuit.

A preferred embodiment of an arithmetic operation processing apparatus of this invention will be described in detail with reference to FIG. 4.

The arithmetic operation processing apparatus of this embodiment calculates an equation such as the equation (1) described above, using three-bit digital data (multiplicands) A (a2, a1, a0) and B (b2, b1, b0) and three-bit digital data (multipliers) J (j2, j1, j0) and K (k2, k1, k0). The arithmetic operation processing apparatus is constructed of first to third selector 201, 202 and 203, and first and second adders 205 and 204.

The multiplicand A is supplied to an input terminal 206. Each bit (a2, a1, a0) of the multiplicand A is latched by a latch circuit 207 and supplied to input terminals "10" of selectors 201 to 203 at a proper timing.

Similarly, the multiplicand B is supplied to an input terminal 208. Each bit data (b2, b1, b0) of the multiplicand B is latched by a latch circuit 209 and supplied to input terminals "01" of the selectors 201 to 203 at a timing in synchronism with the timing of outputting the multiplicand A from the latch 207.

The multiplicands A and B are also supplied to the adder 205 which adds together the multiplicands A and B. In this embodiment, it is assumed that $A+B<2^3$ for the purpose of simplifying the description. With such an assumption, the output of the adder 205 can be expressed by three bits which are herein represented by G (g2, g1, g0). This data G is latched by a latch circuit 214 and supplied to input terminals "11" of the selectors 201 to 203 at a timing in synchronism with the timing of outputting the multiplicand A from the latch 207. The bit data (a2, a1, a0), (b2, b1, b0) and (g2, g1, g0) of the multiplicands A and B and the addition result of A and B are weighted by $(2^2, 2^1, 2^0)$.

The multipliers J (j2, j1, j0) and K (k2, k1, k0) are supplied via input terminals 210 and 212 to latch circuits 211 and 213 and supplied to the selectors 201 to 203. Each bit data of the multipliers J and K is also weighted by $(2^2, 2^1, 2^0)$.

In this embodiment, all bit data of the multipliers is used directly as control signals for the selectors 201 to 203. In this regard, bit data having the same weight is supplied to the same selector. Namely, two bits j2k2 are supplied to the first selector 201, two bits j1k1 to the second selector 202, and two bits j0k0 to the third selector 203.

Each selector selects the input terminals "10" when a control signal "10" is received, the input terminals "01"

upon reception of a control signal "01", and the input terminals "11" upon reception of a control signal "11", to thereby output the data from the corresponding terminals. If a control signal "00" is received, the selectors do not select input terminals to accordingly output 0 values. It may be considered that virtual input terminals "00" with 0 values supplied thereto are used and that when the control signal "00" is received, the virtual input terminals "00" are selected to output 0 values.

Thus, the selectors 201 to 203 selectively output 0 value, multiplicands A, B or G (=A+B) in accordance with the values ("00", "10", "01", or "11") of the control signals (j2k2, j1k1, j0k0) supplied to the selectors. The output values of the first selector 201 change in accordance with the value of the control signal (J2k2) as shown in the following table.

| j2 | k2 | Output value of selector (201) |
|---|---|---|
| 1 | 0 | A (= 1·1·A + 0·0·B) |
| 0 | 1 | B (= 0·0·A + 1·1·B) |
| 1 | 1 | A + B (= 1·1·A + 1·1·B) |
| 0 | 0 | 0 |

This can be expressed by the following general formula.

$$j2 \times k2 \times A + k2 \times B + J2 \times k2 \times (A+B) \qquad (4)$$

The value of the formula (4) and the control signal j2k2 are related to each other as shown in the following table.

| j2 | k2 | j2 | k2 | j2 | k2 | Output value |
|---|---|---|---|---|---|---|
| 1 | 0 | 1 | 1 | 0 | 0 | A |
| 0 | 1 | 0 | 0 | 1 | 1 | B |
| 1 | 1 | 1 | 0 | 0 | 1 | A + B |
| 0 | 0 |   |   |   |   | 0 |

The output value of the selector 201 is expressed therefore by $$\text{formula (4)} = j2 \times A + k2 \times B$$

Similarly, the output values of the second and third selectors 202 and 203 are expressed by $$j1 \times A + k1 \times B \qquad (5)$$

$$j0 \times A + k0 \times b \qquad (6)$$

The data d4, d3, d2, e3, e2, e1, f2, f1, f0 expressed by the formulas (4) to (6) and outputted from the selectors 201 to 203 are weighted and added together by the adder 206.

The control signals (j2k2, j1k1, j0k0) are weighted by ($2^2$, $2^1$, $2^0$) as described above, and the output values from the selectors 201 to 203 are also weighted for each bit data.

The output values from the first to third selectors 201 to 203, when taking the weighting into consideration, can therefore be expressed by $$2^2 \times (j2 \times A + k2 \times B) \qquad (7)$$

$$2^1 \times (j1 \times A + k1 \times B) \qquad (8)$$

$$2^0 (j0 \times A + k0 \times B) \qquad (9)$$

The suffixes of the output values (d4, d3, d2), (e3, e2, e1), and (f2, f1, f0) from the selectors correspond to the weighting factors.

The weighted output values are added together by the adder 204 to output a six-bit arithmetic operation result M (m5, m4, m3, m2, m1, m0).

Figure 2:
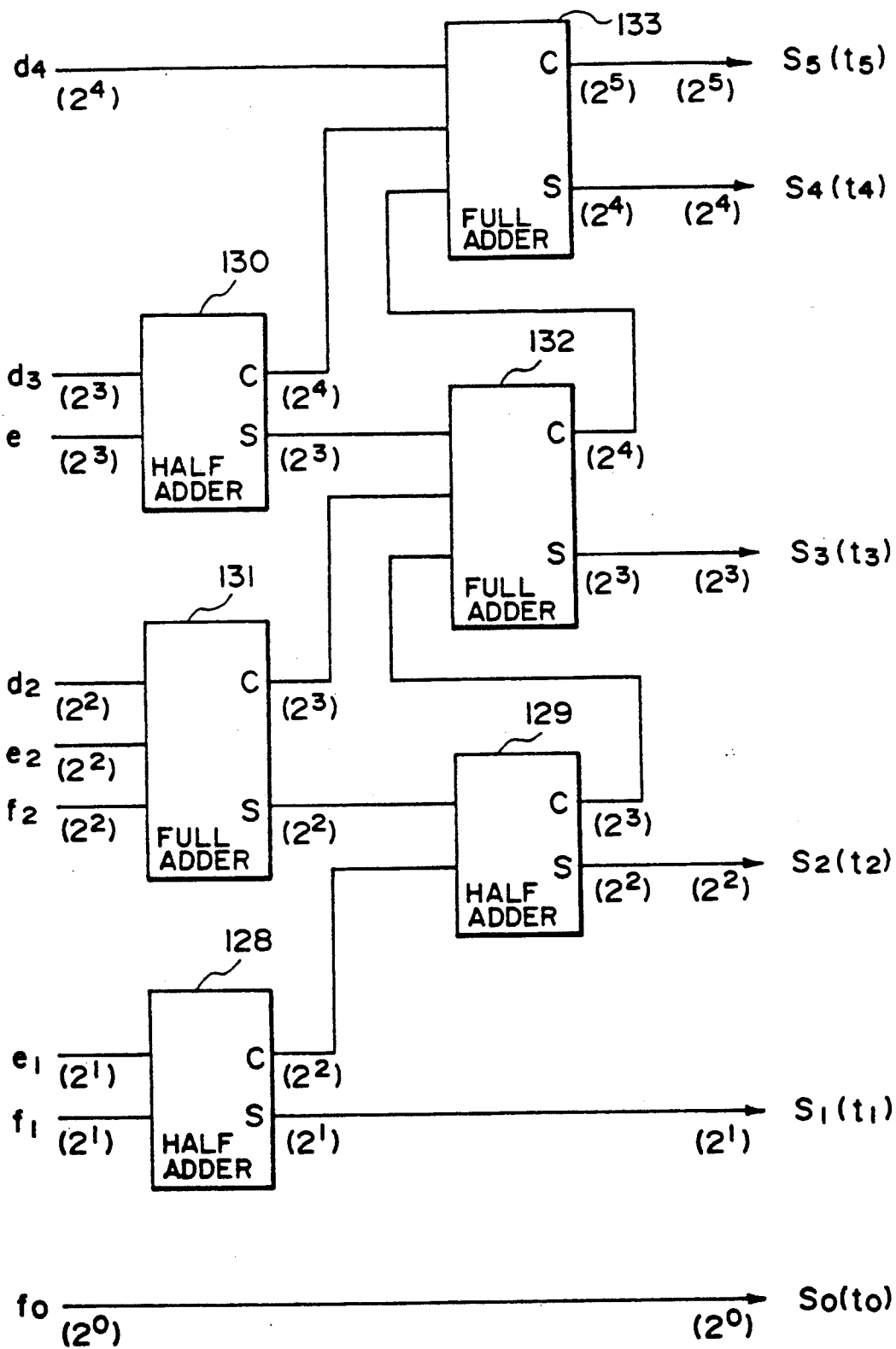
FIG. 2 is a block diagram showing the structure of an adder used with the multiplier shown in FIG. 1.
Figure 3:
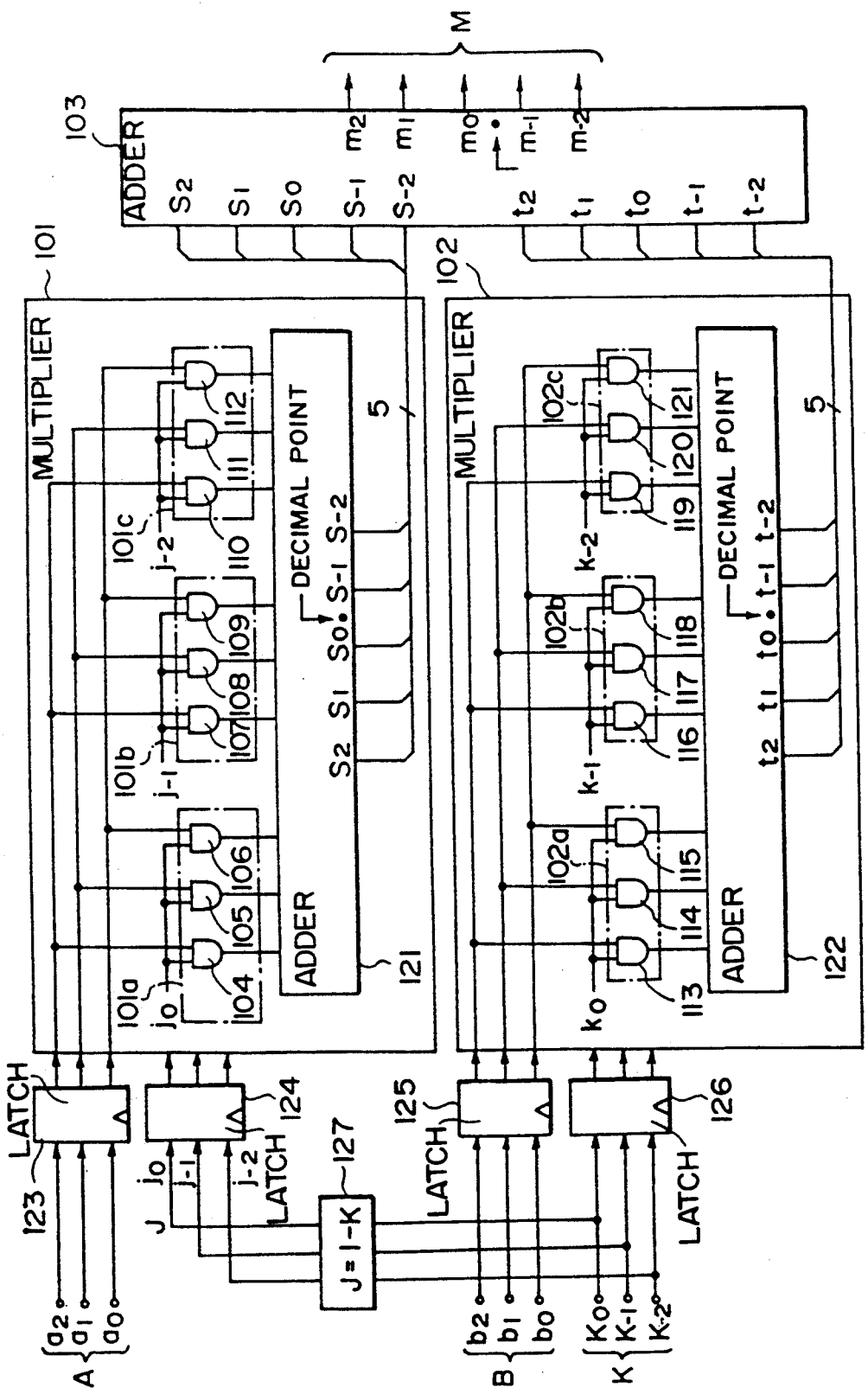
FIG. 3 is a block diagram showing another example of a conventional arithmetic operation processing circuit.

The structure of the adder 204 is the same as the adders 121 and 122 used in the multiplier of the conventional technique (FIG. 1), i.e., the same as the adder shown in FIG. 2.

The operation result by the digital arithmetic operation processing apparatus constructed as above is the sum of the formulas (7) to (9) as apparent from the foregoing description. Namely, $$\begin{aligned} M &= \text{formula (7)} + \text{formula (8)} + \text{formula (9)} \\ &= (2^2 \times j2 + 2^1 \times j1 + 2^0 \times j0) \times A + \\ &\quad (2^2 \times k2 + 2^1 \times k1 + 2^0 k0) \times B \end{aligned}$$

Since $(2^2 \times j2 + 2^1 \times j1 + 2^0 \times k) = J$, and $2^2 \times k2 + 2^1 \times k1 + 2^0 \times k0 = K$, then it follows that $$M = J \times A + K \times B$$

Figure 4:
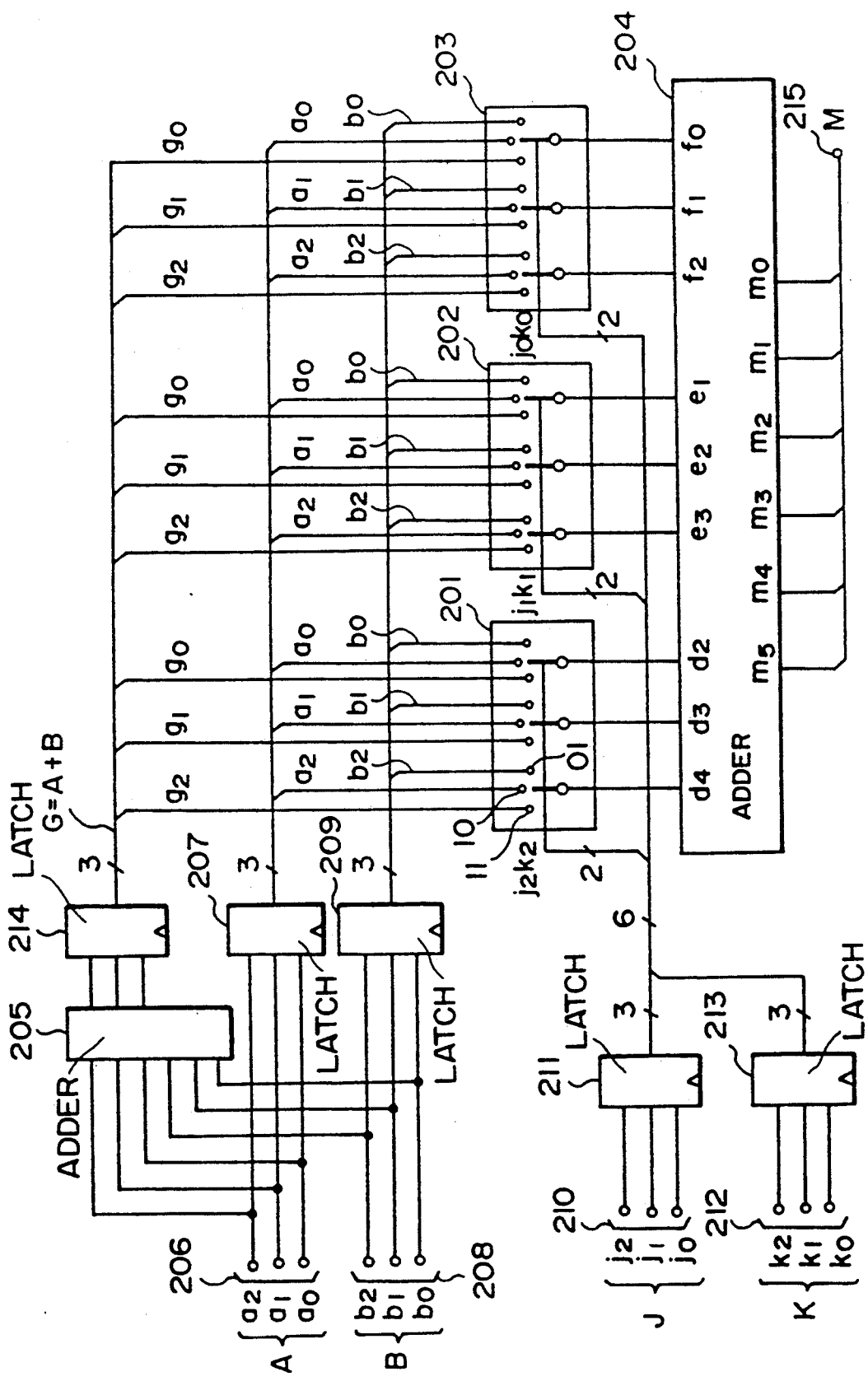
FIG. 4 is a block diagram showing an arithmetic operation processing circuit according to a first embodiment of this invention.

The digital arithmetic operation processing apparatus having the structure as shown in FIG. 4 thus obtains the target operation result.

According to the digital arithmetic operation processing apparatus of this embodiment, the operation of the equation (1) is carried out by selecting each bit data of multiplicands A and B and the addition result A+B and adding together the selected outputs. Therefore, it is not necessary to provide two independent multipliers as in the conventional technique. This embodiment therefore realizes a digital arithmetic operation processing apparatus of a very small circuit scale, of considerably reduced number of circuit elements, and of a simplified structure.

The operation time required by the adder 205 of this embodiment is shorter than the later stage adder 103 of the conventional technique, because the number of bits is smaller than conventional.

This embodiment therefore can reduce the operation time.

Figure 5:
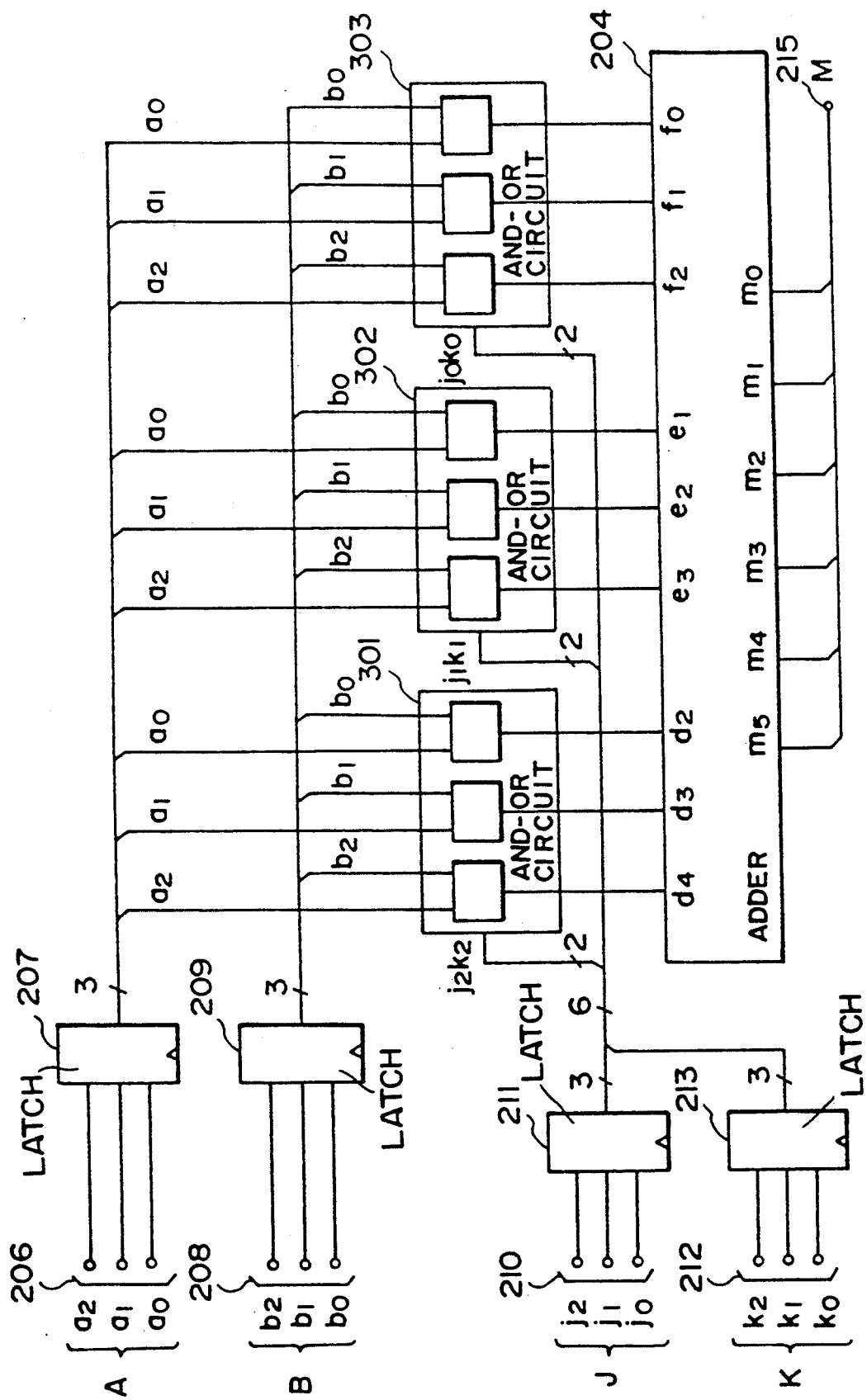
FIG. 5 is a block diagram showing an arithmetic operation processing circuit according to a second embodiment of this invention.

The second embodiment of this invention is shown in FIG. 5.

Figure 6:
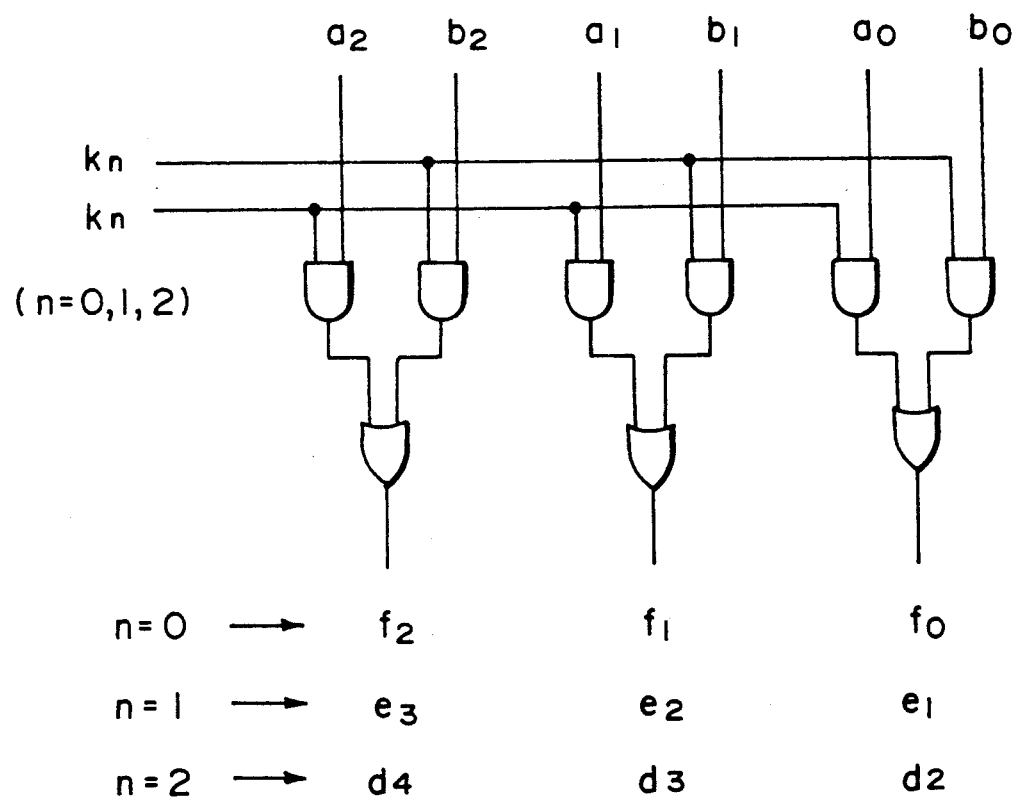
FIG. 6 is a block diagram showing the structure of an AND-OR circuit shown in FIG. 5.

In the structure shown in FIG. 5, the first adder 205 and its latch circuit 214 shown in FIG. 4 are removed and the first to third selectors 201 to 203 are replaced with AND-OR circuits 301 to 303 whose structures are shown in FIG. 6. This second embodiment calculates the same equation (1) as the first embodiment. However, it is assumed that multiplicands A and B (three-bit data) have the condition of $$A + B = 2^3 - 1 = 7 \qquad (10)$$

With this condition, addition of A and B always provides 7. Thus, an addition operation between A and B is not needed.

Therefore, the first adder 205 and its latch circuit 214 shown in FIG. 4 can be removed.

In this embodiment, since the data 7 is expressed by a three-bit binary data 111, the selectors 201 to 203 shown in FIG. 4 may be used as they are by supplying "1" to the input terminal "11" thereof. However, taking into consideration the relationship between selector control signals and outputs and between multiplicands A and B, the selectors 201 to 203 shown in FIG. 4 can be simplified to the AND-OR circuits shown in FIG. 6. The relationship between selector control signals and outputs is given in the following table.

| j2 | k2 | d4 | d3 | d2 |
|----|----|----|----|----|
| 0  | 0  | 0  | 0  | 0  |
| 1  | 0  | a2 | a1 | a0 |
| 0  | 1  | b2 | b1 | b0 |
| 1  | 1  | 1  | 1  | 1  |

This relationship is also applicable to the cases between (j1k1) and (l3l2l1) and between (j0k0) and (f2f1f0).

Since $A+B=7$, it becomes $ai=bi$ ($i=0, 1, 2$). As a result, the AND-OR circuit shown in FIG. 6 has the same function as the selector shown in FIG. 4.

The digital arithmetic operation processing apparatus having the structure as shown in FIG. 6 can therefore calculate the equation (1) under the condition of the equation (10).

The equation (1) under the condition of the equation (10) can be transformed into $$M = R \times \{(1 - B/R) \times J + B/R\} \times K \quad (11)$$

where R is 7 ($A+B = 2^3 - 1$).

The physical meaning of the equation (11) is that M is outputted by mixing the signals J and K by a ratio of $(1-B/R):B/R$ and multiplying it by R. Such an arithmetic opration processing circuit is very effective for a mixing circuit.

Although in this embodiment the case of $A+B=2^n-1$ ($n=3$) is described, it may take any desired value.

According to the digital arithmetic operation processing apparatus, the circuit scale for calculating the equation (11) corresponds to one multiplier of the conventional technique shown in FIG. 1, resulting in a considerable reduction and simplification of the circuit elements.

With such a simplified circuit arrangement, the arithmetic operation processing time can be reduced. Specifically, the conventional technique shown in FIG. 1 requires that the multiplication outputs by the multipliers are added together by the later stage adder 103. However, this embodiment does not require a later stage adder, resulting in corresponding reduction of processing time.

Figure 7:
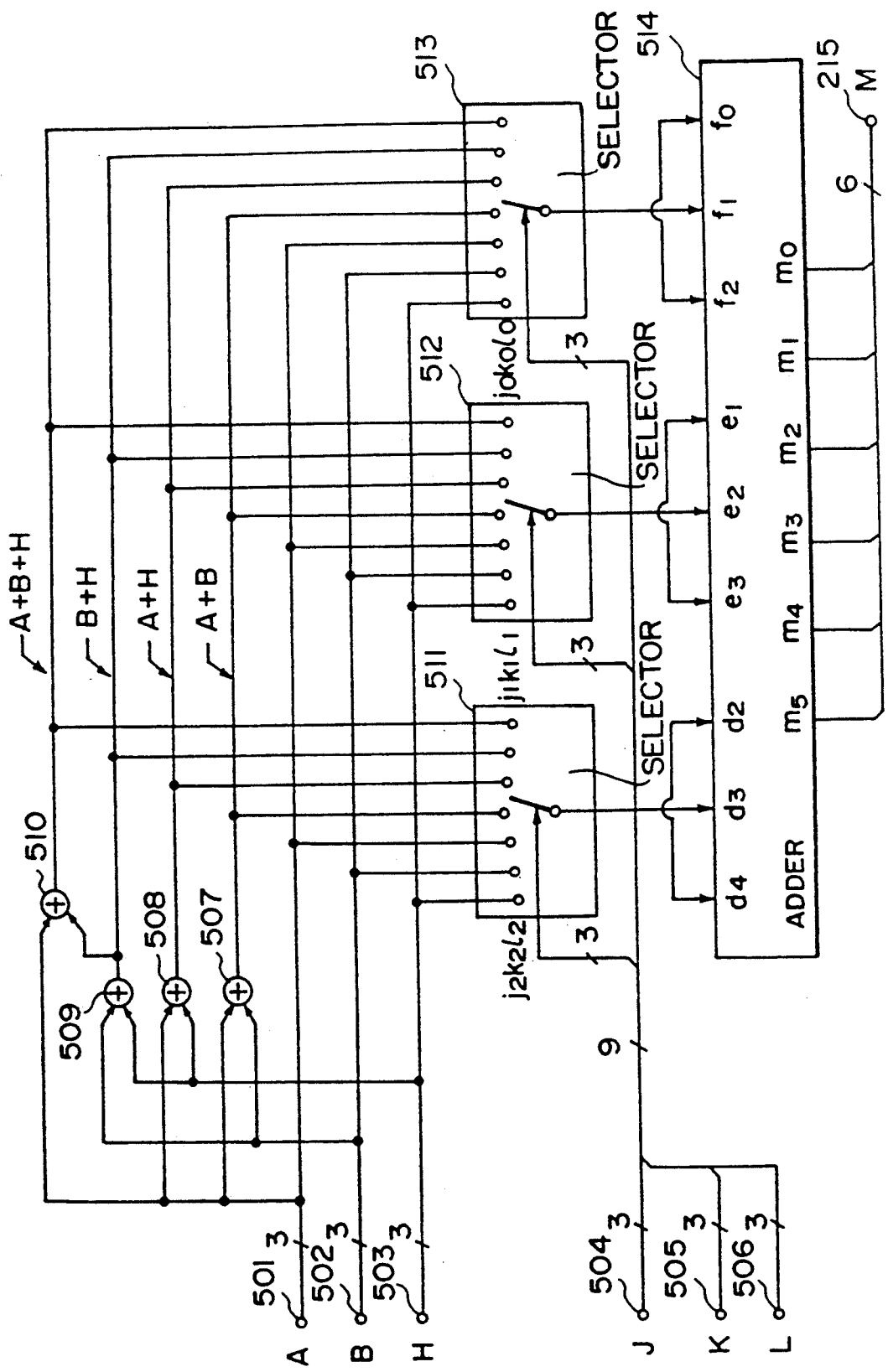
FIG. 7 is a block diagram showing an arithmetic operation processing circuit according to a third embodiment of this invention.

The third embodiment of this invention is shown in FIG. 7.

In FIG. 7, reference numeral 501 denotes an input terminal for a first multiplicand A (a2, a1, a0), 502 denotes an input terminal for a second multiplicand B (b2, b1, b0), 503 denotes an input terminal for a third multiplicand H (h2, h1, h0), 504 denotes an input terminal for a first multiplier J (j2, j1, j0), 505 denotes an input terminal for a second multipler K (k2, k1, k0), 506 denotes an input terminal for a third multiplier L (l2, l1, l0), 507, 508 and 509 denotes adders for adding together A and B, A and H, and B and H, respectively, 510 denotes an adder for adding together A and an output from the adder 509 which adds together B and H, 511, 512 and 513 denotes selectors for selecting one of A, B, H, A+B, A+H, B+H, A+B+C, and 0, 514 denotes an adder for adding together outputs from the selectors 511, 512 and 513, and 515 denotes an output terminal, for an operation result.

The circuit of the third embodiment constructed as above calculates the following equation.

$$M = J \times A + K \times B + L \times H \quad (12)$$

The operation of this circuit will be described below.

The data of three multiplicands A, B and H inputted from the input terminals 501, 502 and 503 is distributed to terminals of the selectors 511, 512 and 513 and to the adders 507, 508, 509 and 510. The adders 507, 508 and 509 add together A and B, A and H, and B and H, respectively, and the addition results are supplied to the selectors 511, 512 and 513. The adder 510 adds together the result, B+H outputted from the adder 509 and A according to output $A+B+H$ which is then supplied to the selectors 511, 512, and 513.

Three multipliers J (j2, j1, j0), K (k2, k1, k0) and L (l2, l1, l0) are supplied to the input terminals 504, 505 and 506, the bit data being grouped into same weighted bits. Thus, as the control signals, j2k2l2 is supplied to the first selector 511, j1k1l1 to the second selector 512, and j0k0l0 to the third selector 513.

To data input terminals of each selector, there are inputted seven data A, B, H, A+B, A+H, B+H, A+B+H on the bit data unit basis. Three bits j, k and l are supplied for selecting seven data. The relationship between control signals and selected output signals is determined as in the following table.

| j | k | l | Selected output signal |
|---|---|---|------------------------|
| 1 | 0 | 0 | A |
| 0 | 1 | 0 | B |
| 0 | 0 | 1 | H |
| 1 | 1 | 0 | A + B |
| 1 | 0 | 1 | A + H |
| 0 | 1 | 1 | B + H |
| 1 | 1 | 1 | A + B + H |
| 0 | 0 | 0 | 0 |

If the three-bit control signal is all 0, seven data is not selected, but 0 is outputted (in other words, 0 is selected and outputted).

The output value of each selector can be expressed by the following formulas by using the multiplicands A, B and H and control signals j, k and l. The following formulas (13) to (15) are for the first to third selectors, respectively.

$$j2 \times A + k2 \times B + l2 \times H \quad (13)$$

$$j1 \times A + k1 \times B + l1 \times H \quad (14)$$

$$j0 \times A + k0 \times B + l0 \times H \quad (15)$$

The output values of the selectors are weighted by predetermined amounts and added together by the later stage adder. The output values considering the weighting are expressed by $$2^2 (j2 \times A + k2 \times B + l2 \times H) \quad (16)$$

$$2^1 (j1 \times A + k1 \times B + l1 \times H) \quad (17)$$

$$2^0 (j0 \times A + k0 \times B + l0 \times H) \quad (18)$$

The above three values are added together by the adder 514 according to output M (m5, m4, m3, m2, m1, m0) which is given by $$M = \text{formula (16)} + \text{formula (17)} + \text{formula (18)}$$
$$= (2^2 \times j2 + 2^1 \times j1 + 2^0 \times j0) \times A +$$
$$(2^2 \times k2 + 2^1 \times k1 + 2^0 \times k0) \times B +$$
$$(2^2 \times l2 + 2^1 \times l1 + 2^0 \times l0) \times H$$

In the above equation, since $2^2 \times j2 + 2^1 \times j1 + 2^0 \times j0 = J$, $2^2 \times k2 + 2^1 \times k1 + 2^0 \times k0 = K$, and $2^2 l2 + 2^1 \times l1 + 2^0 \times l0 = L$, it follows that $$M = J \times A + K \times B + L \times H$$

According to this embodiment, in calculating the equation (12), the circuit scale corresponds to four adders and one multiplier, whereas the conventional technique requires three multipliers and two adders for the addition of the multiplication results.

Under the condition that the sum of multiplicands A, B and H is constant as in the case of the second embodiment, the circuit scale can further be reduced.

In the first to third embodiments, the present invention has been applied to digital arithmetic operation apparatus. Obviously, the present invention is also applicable to an analog arithmetic operation apparatus.

As will be appreciated from the foregoing description of this invention, for the calculation of an equation $M = J \times A + K \times B$ by using four digital data, although the conventional technique requires two multipliers and one adder, the present invention can execute the calculation with a circuit scale corresponding to one multiplier and one adder.

Therefore, the circuit scale of the arithmetic operation processing apparatus of this invention can be made small correspondingly, and the number of circuit elements can be reduced, resulting in a low cost.

Furthermore, reduction of the circuit scale by the present invention results in a shorter arithmetic operation processing time.

Next, the fourth and fifth embodiments of the arithmetic operation processing apparatus of this invention will be described in detail with reference to FIGS. 8 to 10.

The arithmetic operation processing apparatus of the fourth embodiment calculates an equation such as the equation (1) described above, using three-bit digital data (multiplicands) A ($a_2$, $a_1$, $a_0$) and B ($b_2$, $b_1$, $b_0$) and three-bit digital data (multiplier) K ($k_0$, $k_{-1}$, $k_{-2}$). The arithmetic operation processing apparatus is constructed of first to third selectors 601, 602 and 603, an adder 604, and a converter 605 for converting the multiplier K into a control signal P ($pp_{-2}$, $p_{-1}$, $p_{-2}$) for switching the selectors 601 to 603.

The multiplicand A is supplied to an input terminal 606. Each bit data ($a_2$, $a_1$, $a_0$) of the multiplicand A is latched by a latch circuit 607 and supplied via a bus line to input terminals at "0" side of selectors 601 to 603 at a proper timing.

Similarly, the multiplicand B is supplied to an input terminal 608. Each bit data ($b_2$, $b_1$, $b_0$) of the multiplicand B is latched by a latch circuit 609 and supplied via a bus line to input terminals at "1" side of the selectors 601 to 603 at a timing in synchronism with the timing of outputting the multiplicand A from the latch 607.

The bit data ($a_2$, $a_1$, $a_0$) and ($b_2$, $b_0$, $b_1$) of the multiplicand A and B are weighted by ($2^2$, $2^1$, $2^0$).

The multiplier K is supplied to an input terminal 610, and the multiplier K is converted into the control signal P by the converter 605.

Figure 8:
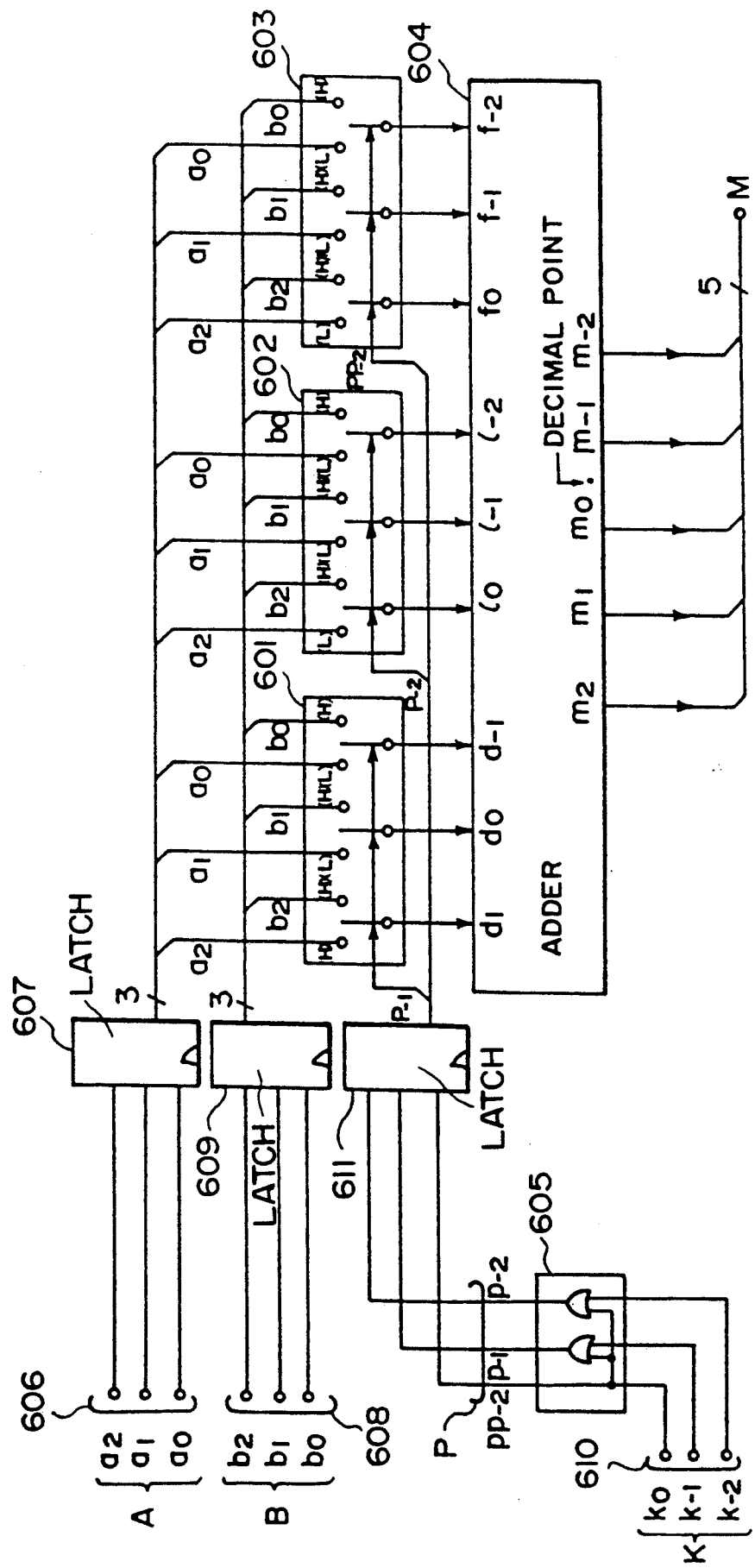
FIG. 8 is a block diagram showing an arithmetic operation processing circuit according to a fourth embodiment of this invention.

This converter 605 is constructed of two OR gates and bus lines as shown in FIG. 8. Each bit data ($k_0$, $k_{-1}$, $k_{-2}$) of the multiplier K is related to each bit data ($pp_{-2}$, $p_{-1}$, $p_{-2}$) of the control signal P such that $pp_{-2}$ corresponds to $K_0$, $p_{-1}$ corresponds to a logical sum of $k_0$ and $k_{-1}$, and $p_{-2}$ corresponds to a logical sum of $k_0$ and $k_{-2}$.

The bit data ($pp_{-2}$, $p_{-1}$, $p_{-2}$) of the control signal is weighted by ($2^2$, $2^{-1}$, $2^{-2}$). The sum $2^{-2} + 2^{-1} + 2^{-2}$) corresponds to "1" of the coefficient (1−k) of the equation (1) and the value K is retained. Specifically, if ($k_0$, $k_{-1}$, $k_{-2}$) is (0 1 0), the value k is $0 \times 2^0 + 1 \times 2^{-1} 0 \times 2^2 = 2^{-1}$. In this case, the bit data ($pp_{-2}$, $p_{-1}$, $p_{-2}$) of the control signal P is converted by the converter 605 into (0 1 0) so that the value P becomes $0 \times 2^{-2} + 1 \times 2^{-1} + 0 \times 2^{-2} = 2^{-1}$ thereby retaining the same values K and P.

The bit data ($pp_{-2}$, $p_{-1}$, $p_{-2}$) of the control signal is supplied via the latch circuit 611 to the selectors 601 to 603. If the supplied data is "0", each selector causes its switching terminal to contact the input terminal (at "0" side), and if the supplied data is "1", each selector causes its switching terminal to contact the input terminal (at "1" side).

In accordance with the value ("1" or "0") of the bit data ($pp_{-2}$, $p_{-1}$, $p_{-2}$) of the control signal P, the selectors 601 to 603 selectively output the corresponding bit data of the multiplicand A or B.

The output value of the first selector 601 is therefore expressed by $$(1 - p_{-1}) \times A + p_{-1} \times B \qquad (20)$$

Similarly, the output values of the second and third selectors 620 and 603 are expressed by $$(1 - p_{-2}) \times A + p_{-2} \times B \qquad (21)$$

$$(1 - pp_{-2}) \times A + pp_{-2} \times B \qquad (22)$$

The data $d_1$, $d_0$, $d_{-1}$, $e_0$, $e_{-1}$, $e_{-2}$, $f_0$, $f_{-1}$, and $f_{-2}$ outputted from the selectors 601 to 603 and expressed by the formulas ($2^0$) to (22) are weighted by predetermined amounts and added together by the later stage adder 604.

The bit data ($pp_{-2}$, $p_{-1}$, $p_{-2}$) of the control signal P is weighted as described above by ($2^{-2}$, $2^{-1}$, $2^{-2}$). The output values of the selectors 601 to 603 are therefore weighted by the amount corresponding to the supplied bit data weighting.

Thus, when considering the weighting, the output values of the first to third selectors 601 to 603 can be expressed by $$2^{-1} \times \{(1 - p_1) \times + p_{-1} \times B\} \qquad (23)$$

$$2^{-2} \times \{(1 - p_2) \times A + p_{-2} \times B\} \qquad (24)$$

$$2^{-2} \times \{(1 - pp_{-2}) \times A + pp_{-2} \times B\} \qquad (25)$$

The suffixes of the output values of the selectors ($d_1$, $d_0$, $d_{-1}$), ($e_0$, $e_{-1}$, $e_{-2}$), and ($f_0$, $f_{-1}$, $f_{-2}$) correspond to the weighting coefficients.

Figure 9:
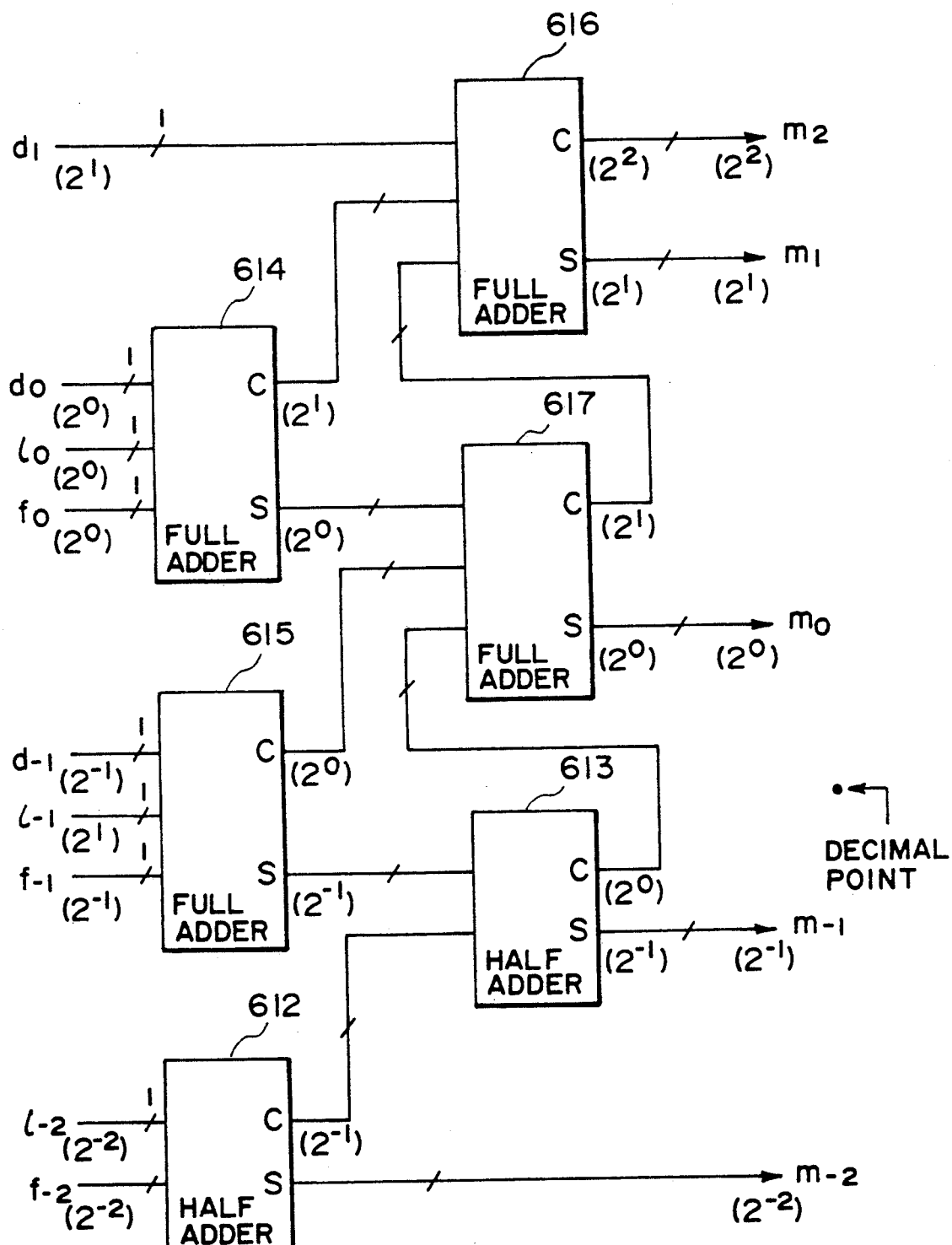
FIG. 9 is a block diagram showing the internal structure of the adder used in the embodiment shown in FIG. 8.
Figure 10:
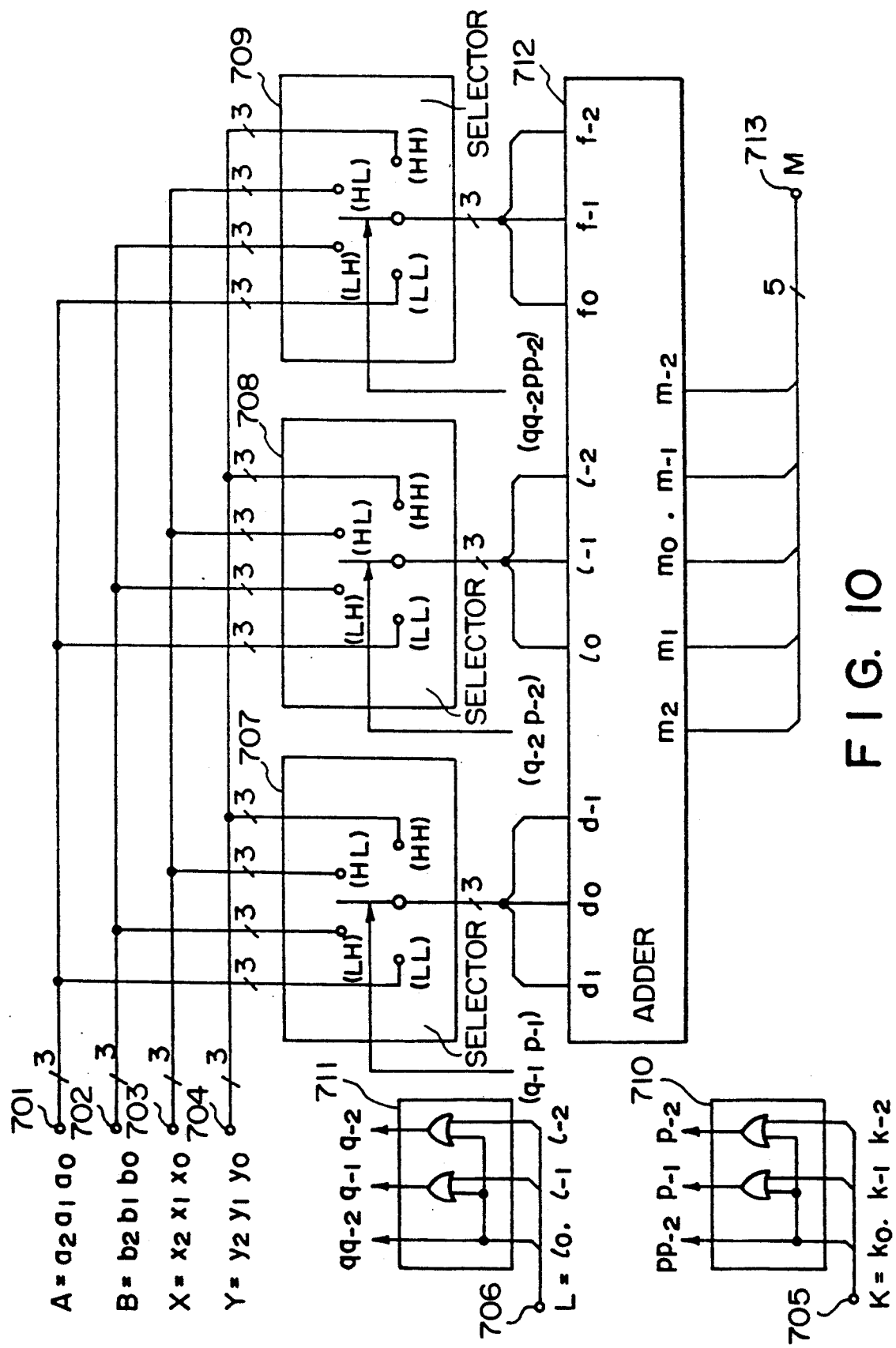
FIG. 10 is a block diagram showing an arithmetic operation processing circuit according to a fifth embodiment of this invention.

The adder 604 for adding such weighted output values is constructed of two one-bit half adders 612 and 614 and four full adders 614 to 617 as shown in FIG. 9. The input/output connection is as shown in FIG. 9 so that a five-bit arithmetic operation output M ($m_2$, $m_1$, $m_0$, $m_{-1}$, $m_{-2}$) is obtained.

The arithmetic operation output M obtained by the digital arithmetic operation processing apparatus constructed as above is the sum of the formulas (23) to (25) as appreciated from the foregoing description. Namely, $$\begin{aligned}M &= \text{formula (23)} + \text{formula (24)} + \text{formula (25)} \\ &= \{(2^{-1} + 2^{-2} + 2^{-2}) - (2^{-1}p_{-1} + 2^{-2}p_{-2} + \\ &\quad 2^{-2}pp_{-2})\} \times A + (2^{-1}p_{-1} + 2^{-2}p_{-2} + \\ &\quad 2^{-2}pp_{-2}) \times B\end{aligned}$$

Substituting $2^{-1}p_{-1} + 2^{-2}p_{-2} + 2^{-2}pp_{-2} = L$ in the above equation, it follows $$M = (1-L) \times A + L \times B \quad (26)$$

The value L is equal to the value ($2^{-2}pp_{-2} 2^{-1}p_{-1} + 2^{-2}p_{-2}$) of the control signal ($pp_{-2}$, $p_{-1}$, $p_{-2}$) which is the retained value K, ($2^0 k_0 + 2^{-1} K_{-1} + 2^{-2} K_{-2}$) as described before, resulting in L=K.

Namely, if $k_0 = 1$, then $k_{-1} = 0$ and $k_{-2} = 0$ according to the input condition of K ($0 \leq K \leq 1$), and then $pp_{-2} = 1$, $p_{-1} = 1$ and $p_{-2} = 1$ according to the structure of the converter 605 shown in FIG. 8. Accordingly, it follows $$L = 2^{-1}p_{-1} + 2^{-2}p_{-2} + 2^{-2}pp_{-2} = 1 = K \quad (27)$$

On the other hand, if $k_0 = 0$ and $0 \leq K < 1$, the value of the control signal P ($pp_{-2}$, $p_{-1}$, $pp_{-2}$) becomes as $pp_{-2}$, $p_{-1}$, $p_{-1} = k_{-2}$. Accordingly it follows $$\begin{aligned}L &= 2^{-1}p_{-1} + 2^{-2}p_{-2} + 0 \\ &= 2^{-1}k_{-1} + p^{-2}k_{-2} = K\end{aligned} \quad (28)$$

Thus, L becomes equal to K under any input condition of K so that L in the equation (26) can be replaced with K. The digital arithmetic operation processing apparatus constructed as shown in FIG. 8 can obtain an operation output M of the equation, i.e., $$M = (1-L) \times A + L \times B = (1-K) \times A + K \times B$$

As described above, the digital arithmetic operation processing apparatus of this embodiment calculates the equation (3) by sharing the selectors 601 to 603 for both multiplicands A and B, without using two separate multipliers as is conventional.

According to this embodiment, the circuit scale and circuit elements of the digital arithmetic operation processing apparatus can be reduced considerably.

Such a simplified structure essentially allows the shortening of the operation processing time. In a conventional technique shown in FIG. 1, it is necessary to add together the multiplication results by the multipliers at the later stage adder. However, in this embodiment, such a later stage adder is not needed so that the operation processing time is reduced correspondingly and considerably.

The above advantages are particularly effective when applied to digital circuits for processing video signals which circuits are required to have the characteristics of compact size, light weight, and high speed digital data processing.

In the above embodiment, the multiplier J for the multiplicand A is set as having a value 1−K. This multiplier J may be set at n−K. In such a case, the value of the control signal P ($pp_{-2}$, $p_{-1}$, $p_{-2}$) is set at n.

Furthermore, the selectors 601 to 603 may be constructed of AND circuits which are controlled by the bit data ($pp_{-2}$, $p_{-1}$, $p_{-2}$) of the control signal P.

Next, the fifth embodiment of this invention will be described with reference to FIG. 10. FIG. 10 is a block diagram showing the digital arithmetic operation processing apparatus of the fifth embodiment. In FIG. 10, reference numeral 701 denotes an input terminal for a first multiplicand A ($a_2$, $a_1$, $a_0$), 702 denotes an input terminal for a second multiplicand B ($b_2$, $b_1$, $b_0$), 703 denotes an input terminal for a third multiplicand X ($x_2$, $x_1$, $x_0$), 704 denotes an input terminal for a fourth multiplicand Y ($y_2$, $y_1$, $y_0$), 705 denotes an input terminal for a first multiplier K ($k_0$, $k_{-1}$, $k_{-2}$), 706 denotes an input terminal for a second multiplier L ($l_0$, $l_{-1}$, $l_{-2}$), 707 to 709 denote selectors for selecting one of the four multiplicands, 710 and 711 denote converters for converting the two multipliers K and L into a two-bit control signal for controlling the selectors 707 to 709, 712 denote an adder for adding together the outputs from the selectors 707 to 709, and 713 denote an output terminal for an operation result.

The structure and operation of the converters 711 and 710 are similar to those of the converter 605 of the preceding embodiment. A combination (qi, pi) of the outputs of the converters 710 and 711 are used for the switching control of the selectors 707 to 709.

The operation of this embodiment will be described below.

Each bit data of the four multiplicands A, B, X and Y inputted from the input terminals 701 to 704 are distributed and supplied to terminals of the selectors 707 to 709. The two-bit control signal (qi, pi) is used for the switching control of the selectors such that one of the four multiplicands is selected and outputted. An output of each selector is multiplied by a weighting coefficient $2^i$ in accordance with the control signal qipi.

For example, an output of the selector 707 is expressed by $$2^{-1}(q_{-1} \times p_{-1} \times A + q_{-1} \times p_{-1} \times B + q_{-1} \times p_{-1} \times X + q_{-1} \times p_{-1} \times Y) \quad (29)$$

Similarly the outputs of the selectors 708 and 709 are expressed by $$2^{-2}(q_{-2} \times p_{-2} \times A + q_{-2} \times p_{-2} \times B + q_{-2} \times p_{-2} \times X + q_{-2} \times p_{-2} \times Y) \quad (30)$$

$$2^{-2}(qq_{-2} \times pp_{-2} \times A + qq_{-2} \times pp_{-2} \times B + qq_{-2} \times pp_{-2} \times X + qq_{-2} \times pp_{-2} \times Y) \quad (31)$$

The outputs of the selectors are added together by the adder 712 and outputted as M=$m_2$ $m_1$ $m_{0 \times m-1}$ $m_{-2}$ at the terminal 713. The function of the adder 712 is quite the same as the adder 604 of the fourth embodiment.

In this embodiment, the control signal (qi, pi) for the selectors 707 to 709 is generated from the multipliers as described above. The blocks 710 and 711 are the same as the converter 605 of the fourth embodiment. In this embodiment, however, two multipliers K and L are used for generating the control signal. Therefore, the number of input signals per one selector is increased to $2^2=4$. In this regard, if three multipliers are used for generating the control signal, the number of input signals per one selector is increased to 8 ($2^3$) so that a maximum of eight multiplicands can be used.

As a combination of the control signal (qi, pi), it is necessary to select two bits having the same weighting coefficient, i.e., having the same suffix of qi and pi (a combination of, e.g., $q_{-1} p_{-2}$ is not permitted).

In this embodiment, with such a two-bit control signal, the output operation results can be expressed by using the multipliers K and L as in the following.

For L=0, $$M=(1-K)\times A+K\times B \tag{32}$$

For L=1, $$M=(1-K)\times X+K\times Y \tag{33}$$

For K=0, $$M=(1-L)\times A+L\times X \tag{34}$$

For K=1, $$M=(1-L)\times B-L\times Y \tag{35}$$

For L=K, $$M=(1-K)\times A+K\times Y \tag{36}$$

According to this embodiment, various operations such as shown in the equations (32) to (36) can be executed with a simple circuit structure by using four multiplicands A, B, X and Y and two multipliers K and L.

Instead of two multipliers, an increased number of multipliers n may also be used. In such a case, $2^n$ multiplicands may be used. Furthermore, by using proper interconnection of the selectors, an optional combination of operations can be realized.

This invention is also applicable to an analog arithmetic operation processing apparatus.

As will be appreciated from the foregoing description, as compared with a conventional structure of two multipliers and one adder, the present invention requires a circuit scale and circuit elements corresponding to one multiplier for the execution of an operation of $(1-K)\times A+K\times B$ by using one or more multiplier (e.g., K, $0\leq K\leq 1$) and multiplicands (e.g., A, B). Thus, an apparatus of low cost and high reliability can be realized. In addition, with such an arrangement, the operation processing time is reduced to a great extent.

What is claimed is:

1. An arithmetic operation processing apparatus wherein a plurality of pairs of multipliers and multiplicands, the bit data of both of which are weighted by the same amount, are inputed, and multiplication results of respective pairs are added together and outputted, said arithmetic operation processing apparatus comprising:

control signal generating means for generating a control signal from a plurality of multipliers which are inputted, said control signal corresponding to each bit of the multipliers;

a selector including a plurality of selector circuits controlled by the control signal corresponding to each bit of the multipliers, each of said plurality of selector circuits for selectively outputting one of each multiplicand, an addition result of two or more multiplicands, and 0 value, in accordance with the control signal generated by said control signal generating means; and an adder for adding together the outputs from said plurality of selector circuits.

2. An arithmetic operation processing apparatus according to claim 1, wherein said each multiplier is digital data of n-bit where n is an integer of at least 2, and said selector has n selector circuits corresponding to respective bit data of said multiplier, said selector circuits being controlled by a combination of corresponding bit data of said each multiplier.

3. An arithmetic operation processing apparatus according to claim 1, wherein said each multiplier is digital data of m-bit where m is an integer of at least 2, said each multiplicand being digital data of n-bit, and said selector has n selectors circuits corresponding to respective bit data of said multiplier and is supplied with respective bit data of said each multiplicand or of an addition output of two or more multiplicands, said selector circuits being controlled by a combination of corresponding bit data of said each multiplier and outputting said each multiplicand, an addition output of two or more multiplicands, or 0 value.

4. An arithmetic operation processing apparatus according to claim 3, wherein said selector circuit has n select elements corresponding to respective bit data of said each multiplicand, said selector elements being controlled by a combination of corresponding bit data of said each multiplier.

5. An arithmetic operation processing apparatus according to claim 3, wherein said selector circuits include a plurality of AND circuits each supplied with one bit data of said plurality of multiplicands and controlled by one bit data of said multiplier, and OR circuits each for obtaining a logical sum of predetermined ones of said AND circuits.

6. An arithmetic operation processing apparatus according to claim 4, wherein said selector circuits or said select elements include a plurality of AND circuits each supplied with one bit data of said plurality of multiplicands and controlled by one bit data of said multiplier, and OR circuits each for obtaining a logical sum of predetermined ones of said AND circuits.

7. An arithmetic operation processing apparatus according to claim 1, wherein said each multiplier and said each multiplicand are digital data, and the outputs from said selectors are weighted and added together by said adder.

8. An arithmetic opration processing apparatus wherein one or more multipliers and a plurality of multiplicands are inputted, a multiplication result between one multiplier and one multiplicand and a multiplication result between a complement of said one multiplier and another multiplicand are added together and outputted, said arithmetic operation processing apparatus comprising:

a plurality of selectors each for selectively outputting said one multiplicand or said another multiplicand in accordance with a plurality of control signals generated from said one multiplier; and an adder for adding together outputs from said selectors.

9. An arithmetic operation processing apparatus according to claim 8, wherein said each multiplier is digital data of n-bit, where n is an integer of at least 2, and said plurality of control signals generated from said multiplier include n digital data each constructed of one bit and corresponding to a predetermined bit data of said multiplier or an arithmetic operation output of a predetermined bit data of said multiplier.

10. An arithmetic operation processing apparatus according to claim 9, wherein a weighted addition value of said plurality of control signals is equal to a weighted addition value of respective bit data of said multiplier.

11. An arithmetic operation processing apparatus according to claim 10, wherein said each multiplier is digital data of n-bit, where n is an integer of at least 2, and said plurality of control signals generated from said multiplier include n digital data each constructed of one bit and corresponding to a predetermined bit data of said multiplier or an arithmetic operation output of a predetermined bit data of said multiplier.

12. An arithmetic operation processing apparatus according to claim 8, wherein a weighted addition value of said plurality of control signals is equal to a weighted addition value of respective bit data of said multiplier.

13. An arithmetic operation processing apparatus according to claim 8, wherein said each multiplier is digital data of m-bit, where m is an integer of at least 2, said each multiplicand is digital data of n-bit, where n is an integer of at least 2, said plurality of control signals generated from said multiplier include n digital data each constructed of one bit and corresponding to a predetermined bit data of said multiplier or an arithmetic operation output of a predetermined bit data of said multiplier, and said selectors are controlled by said n digital data and selectively outputting said one multiplicand or said another multiplicand.

14. An arithmetic operation processing apparatus according to claim 13, wherein said selector circuits include n select elements corresponding to respective n bit data of said each multiplicand, said select elements being controlled by said respective control signals and selectively outputting a predetermined bit data of said one multiplicand or a bit data of said other multiplicand corresponding to the first-mentioned bit data.

15. An arithmetic operation processing apparatus according to claim 8, wherein said multiplier and multiplicand each are digital data, and the outputs from said selectors are weighted and added together by said adder.

* * * * *

UNITED STATES PATENT AND TRADEMARK OFFICE
CERTIFICATE OF CORRECTION

PATENT NO. : 5,185,714

DATED : February 9, 1993

INVENTOR(S) : TADAYOSHI NAKAYAMA

It is certified that error appears in the above-indentified patent and that said Letters Patent is hereby corrected as shown below:

COLUMN 3
    Line 34, "multiplication," should read --multiplication--.

COLUMN 7
    Line 62, "denotes" should read --denote--.
    Line 66, "denotes" should read --denote--.

COLUMN 9
    Line 14, "$2^2 12^1 \times 11 + 2^0 \times 10 = L$," should read --$2^2 \times \ell 2 + 2^1 \times \ell 1 + 2^0 \times \ell 0 = L$,--.

COLUMN 10
    Line 21, "$0 \times 2^0 + 1 \times 2^{-1}\ 0 \times 2^2 = 2^{-1}$." should read --$0 \times 2^0 + 1 \times 2^{-1} + 0 \times 2^{-2} = 2^{-1}$.--.
    Line 51, "($2^0$)" should read --(20)--.
    Line 63, "$2^{-1} \times \{(1-p1) \times + p_{-1} \times B\}$" should read ---$2^{-1} \times \{(1-p_1) \times A + p_{-1} \times B\}$--.

COLUMN 11
    Line 25, "$M = (1-L) \times A + L \times B$" should read --$M = (1-L) \times A + L \times B$--.
    Line 27, "($2^{-2}\ pp_{-2} 2^{-1}$" should read --($2^{-2}\ pp_{-2} + 2^{-1}$--.

UNITED STATES PATENT AND TRADEMARK OFFICE
CERTIFICATE OF CORRECTION

PATENT NO. :     5,185,714

DATED       :     February 9, 1993

INVENTOR(S) :    TADAYOSHI NAKAYAMA

It is certified that error appears in the above-identified patent and that said Letters Patent is hereby corrected as shown below:

COLUMN 12
    Line 23, ", terminal" should read --terminal--.

COLUMN 14
    Line 26, "selectors" should read --selector--.

Signed and Sealed this

Twenty-fifth Day of January, 1994

Attest:

BRUCE LEHMAN

Attesting Officer      Commissioner of Patents and Trademarks